Jan. 17, 1956 J. S. KESSLER 2,730,992
CONVERTIBLE MILKING AND WASHING PIPE LINE SYSTEM
Filed Sept. 5, 1952 2 Sheets-Sheet 1
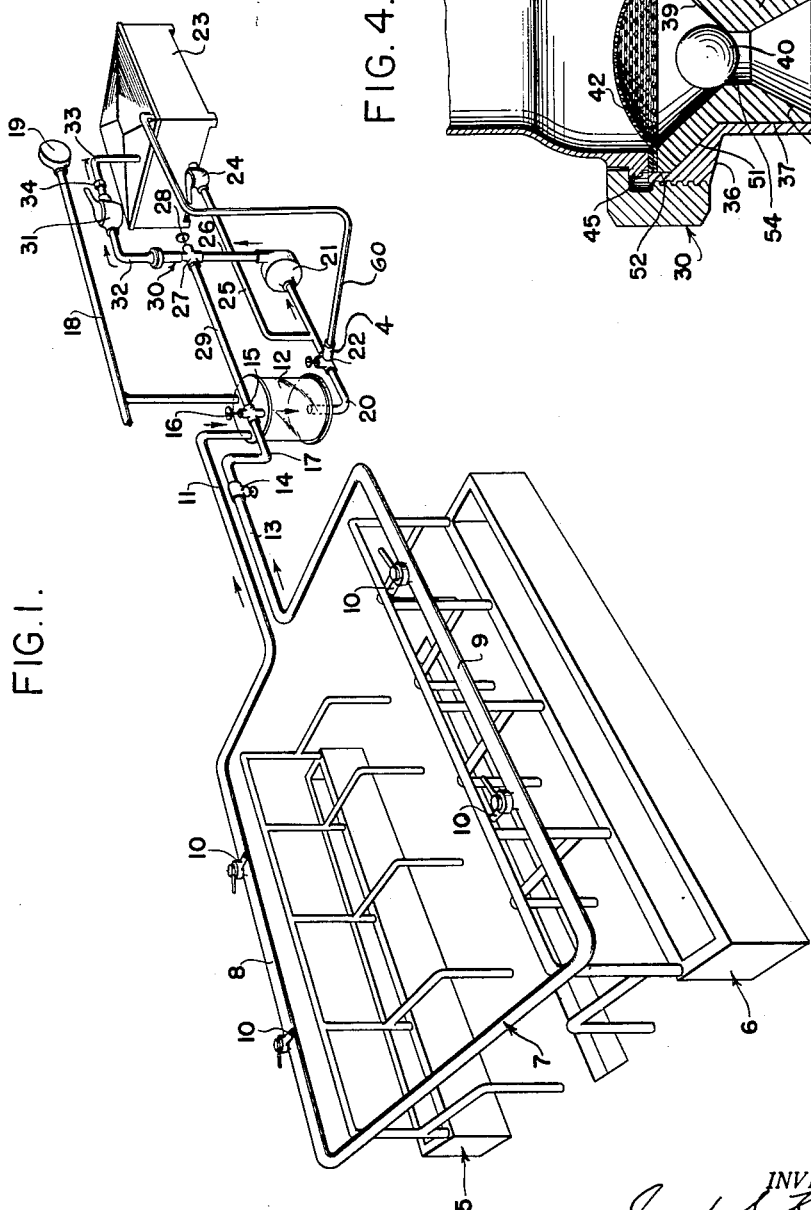
INVENTOR.
Joseph S. Kessler
BY
ATTORNEYS Jan. 17, 1956 J. S. KESSLER 2,730,992
CONVERTIBLE MILKING AND WASHING PIPE LINE SYSTEM
Filed Sept. 5, 1952 2 Sheets-Sheet 2
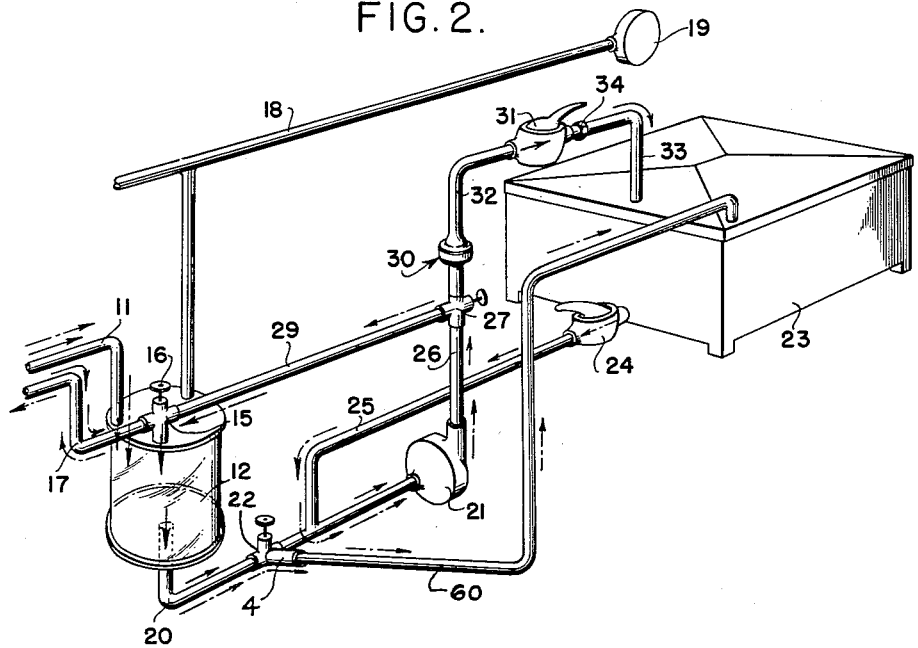
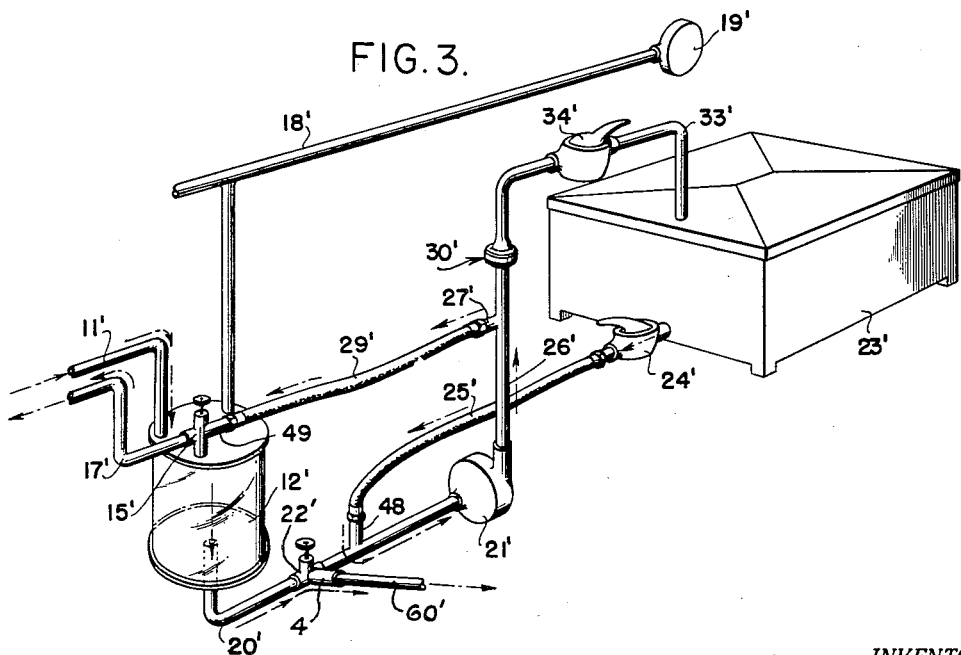
INVENTOR.
Joseph S. Kessler
BY
ATTORNEYS

United States Patent Office 2,730,992
Patented Jan. 17, 1956

2,730,992

CONVERTIBLE MILKING AND WASHING PIPE LINE SYSTEM

Joseph S. Kessler, Kenosha, Wis., assignor, by mesne assignments, to Ladish Co., Cudahy, Wis., a corporation of Wisconsin Application September 5, 1952, Serial No. 307,955

5 Claims. (Cl. 119—14.03)

This invention relates to improvements in convertible milking and washing pipe line systems.

The trend in modern dairy barns is toward utilization of a line milking system for directing milk from the milking apparatus into a receiver jar remote from the milking station. This eliminates pouring and other handling of the milk at or near the milking station. In this type of installation, the milk is ordinarily drawn from the line into the receiver jar by means of a vacuum pump, and is pumped from the receiver jar into a storage tank or other receptacle by means of a second pump. The rate at which the milk is pumped from the receiver jar into the storage tank is normally relatively slow, approximating the rate at which the milk flows into the receiver jar from the line.

With this type of installation after the milking operation has been completed, the system lines must be cleaned with a detergent solution. To be effective, the solution must flow through the lines at a velocity of not less than five feet per second. In a one and one-half inch sanitary line, this rate approximates twenty-five gallons per minute. Heretofore it has been common practice to utilize a positive displacement pump of relatively low capacity for pumping milk from the receiver jar into the storage receptacle, and to use a separate pump of higher capacity for pumping the detergent solution through the lines during the cleaning operation.

The use of a centrifugal pump in a conventional type of system for pumping milk from the receiver jar has not heretofore been successful, since the receiver jar is under a twelve to fifteen inch vacuum and cavitation of the pump frequently resulted. On the other hand, the positive displacement pump commonly used for pumping the milk from the receiver jar is not satisfactory for pumping the detergent solution through the lines, since it cannot develop the required velocity of fluid flow.

With the above in mind, it is a principal object of the present invention to provide an improved dairy barn milking line system wherein a single pump is used for the dual purpose of pumping milk from the receiver jar during the milking operation, and for pumping detergent solution through the lines of the system during the cleaning operation.

A further object of the invention is to provide an improved milking system of the class described wherein the pump is of the centrifugal type having sufficient capacity to provide the required velocity of flow for the cleaning operation, there being means in the combination for restricting the output of said pump when the latter is used for pumping milk from the receiver jar to the storage tank.

A further object of the invention is to provide an improved milking system of the class described which includes a venturi type check valve arranged to restrict the discharge of milk from the pump, and also to prevent the entrance of air into the receiver jar, should the latter be pumped dry.

A further object of the invention is to provide an improved venturi type check valve for use in the improved system, said valve being provided with a venturi insert which is replaceable by one of different size to selectively change the rate at which milk is pumped from the receiver jar by the pump.

A further object of the invention is to provide an improved milking system of the class described which is relatively simple in construction and positive in operation, said operation being free from objectionable pump cavitation.

With the above and other objects in view, the invention consists of the improved dairy barn milking system, and all of its parts and combinations, as set forth in the claims, and all equivalents thereof.

In the drawings accompanying and forming a part of this specification, wherein two forms of the invention are shown, and wherein like characters of reference indicate the same parts in all of the views:

Fig. 1 is a perspective view of the preferred form of the invention;

Fig. 2 is a fragmentary perspective view showing a portion of the system of Fig. 1 on a larger scale;

Fig. 3 is a view similar to Fig. 2 showing a modified form of the invention; and Fig. 4 is an enlarged vertical sectional view of a venturi type check valve as used in the system.

Referring now to Fig. 1 the numbers 5 and 6 indicate rows of stalls at the milking station of a dairy barn. A common milk line 7 may take the form of a loop having extents 8 and 9 paralleling the rows of stalls 5 and 6. The extents 8 and 9 are provided with valved connections 10 to which the milking apparatus (not shown) is removably connected during the milking operation. One end 11 of the line 7 opens into the top of a glass milk receiver jar 12, the other end 13 being connected to a line 17 and having a normally closed air vent 14.

A cross valve 15 has a horizontal passage therethrough which is continuously open, and also has a vertical passage which selectively communicates with said horizontal passage and which may be closed off by turning the valve handle 16. The vertical passage of valve 15 opens into the top of the glass receiver jar 12, and this conduit 17 connects with one end of the horizontal passage of valve 15. One end of a conduit 18 opens into the top of the receiver jar 12, and its other end is connected to a vacuum pump 19.

One end of a conduit 20 opens into the bottom of receiver jar 12, and its other end is connected to the inlet of a centrifugal pump 21, there being a three-way valve 22 interposed in conduit 20 as shown and having an outlet tube 4. This valve is constructed to provide communication straight through the pipe 20 during the milking operation, the outlet tube being shut off; to provide communication between the bottom of the receiver jar 12 and the outlet tube 4, with the passageway leading to the pump 21 cut off which is used when cleaning fluid is being recirculated through the tank; or to provide communication between the pipe 20 on both sides of the valve 22 with the outlet tube when it is desired to drain the system.

The numeral 23 indicates a milk storage tank or other suitable receptacle which may take the form of a cooler, or the like. A normally closed drain valve 24 opens into the bottom portion of tank 23. One end of a conduit 25 is connected to drain valve 24, and its other end communicates with conduit 20 between valve 22 and pump 21 as shown. A conduit 26 connects the outlet of pump 21 with a cross valve 27 similar to the cross valve 15. The valve 27 has a vertical passage therethrough which is continuously open, and has a horizontal passage which selectively communicates with the vertical passage by turning the valve handle 28.

A conduit 29 connects the horizontal passage of valve 27 to the horizontal passage of valve 15 as shown. The upper end of the vertical passage of valve 27 communicates with a venturi type check valve 30 which will be described in detail later, the other end of the check valve 30 being connected to a normally open shut off valve 31 through a conduit 32. The valve 31 is connected to a discharge spout 33 through a union joint 34, the spout 33 normally extending into the tank 23 through a suitable aperture in the cover.

Referring to Fig. 4, the illustrated valve 30 is provided with a tubular body 35 which is formed at its end with an outwardly directed annular flange 36. The tubular body 35 is formed with a portion of increased internal diameter 37 to form an annular shoulder 50. The portion 37 connects with an outwardly flared frusto-conical surface 51 which, in turn, connects with a cylindrical portion 52 of increased diameter. A tubular venturi and valve seat member or insert 53 has an outer contour conforming to the inner surface of portions 37, 51, and 52, and is removably positioned within body member 35 in abutment with shoulder 50, as shown. The venturi member 53 has a portion 54 of reduced internal diameter intermediate its length, the ends of the portion 54 being connected to outwardly flaring frusto-conical surface portions 38 and 39, respectively.

A rubber ball check valve 40 is normally seated on the conical surface 39. Positioned on the flat annular end surface 41 of insert 53 within portion 52 of body 35 is the flat peripheral portion of a concavo-convex perforated retaining plate 42. An annular gasket 43 is positioned on the flat peripheral portion of the plate 42, and a cooperable conduit member 44 connected to the lower end of pipe 32 is positioned on gasket 43 as shown. The member 44 is provided with an outwardly directed annular flange 45, and a nut 46 engages the flange 45 and may be threaded on the flange 36 of member 35 to disconnectably hold the parts in the assembled condition shown.

During a normal milking operation, valve 31 is open and valve 22 is in a position to pass from the receiver jar into the pump, the connection 4 being shut off. The valves 10 to which milking apparatus is connected are also open. Drain valve 24 is closed during the milking operation. In addition the vertical passage of valve 15 is put in communication with the horizontal passage thereof so that conduit 17 communicates with the receiver jar 12. At the same time, the horizontal passage of valve 27 is closed off from the vertical passage of said valve.

The vacuum pump 19 creates a vacuum condition in the receiver jar 12 of approximately 12 to 15 inches of mercury. This vacuum causes milk to be drawn from the milking apparatus through valves 10 and lines 11 and 13—17 into the receiver jar 12. The normal flow of milk in the system is indicated by solid arrows in Figs. 1 and 2.

Pump 21 withdraws milk from receiver jar 12 through conduit 20 and valve 22, said milk being discharged into conduit 26, flowing therefrom through valves 27 and 30, conduit 32, valve 31 and spout 33 into storage receptacle 23. If desired, the spout 33 may be disconnected at union 34 to permit a hose leading to a tank truck to be connected to said unions.

The diameter of the portion 54 of venturi insert 53 is such that the rate of milk flow therethrough is no greater than that which is necessary to keep up with the normal flow of milk into the receiver jar from the lines 11 and 13. This prevents cavitation of pump 21. If, however, the receiver jar should be pumped dry by the pump 21, air will be prevented from entering said jar from the tank 23 by the action of ball check valve 40. If the receiver jar 12 should become empty, the force of gravity, plus the vacuum in jar 12 acting through conduit 20, pump 21, conduit 26 and valve 27 draws the ball valve member 40 onto its seat on surface 39, thus preventing loss of vacuum in the receiver.

After the milking operation has been completed, the milk is removed from the receptacle 23, and a quantity of detergent solution may be placed in said receptacle preparatory to cleaning out the system lines. The valves 10, 31 and 15 are closed for the cleaning operation, and valves 24 and 27 are opened. Valve 22 is set to allow detergent from the receiver jar to flow out of the outlet 4. Preferably a hose 60 is connected to said outlet to direct the detergent back into the tank 23. As the pump 21 is operated, the detergent solution is drawn from the receptacle 23 through valve 24 and conduits 25 and 20, and is discharged into conduit 26 to flow through valve 27, conduit 29, horizontally through the valve 15, through the lines 17, 13 and into the loop 7, as indicated by the dot and dash arrows in Fig. 2. The detergent solution returns from the line 7 through the end portion 11 into the receiver jar 12 as also indicated by dot and dash lines in Fig. 2.

When the receiver jar 12 becomes full of detergent solution, the detergent is circulated through the system by the pump 21 for a predetermined time at a rate of approximately five feet per second. This rate is substantially greater than the rate at which the milk is withdrawn from the receiver jar 12 during the milking operation. The higher rate of flow is possible during the cleaning operation, since all of the solution discharged from the pump 21 flows unrestricted into the system without having to flow through the venturi type check valve 30.

When the detergent has circulated through the system sufficiently to do a proper cleaning job, the valve 27 is closed and valves 24 and 31 are opened. Operation of the pump 21 then withdraws cleaning solution from the receiver jar 12 and from the line 7, air being permitted to enter the line 7 through the air vent 14 which has been opened. The cleaning solution thus withdrawn from the receiver jar and line 7 is pumped out through valve 27, venturi check valve 30, conduit 32, valve 31 and spout 33. At this stage the spout 33 is swung laterally so that the detergent solution issuing therefrom is directed away from the receptacle 23 toward a suitable drain (not shown). The pumping out of the detergent solution in this manner flushes out the lines closed off during the previous detergent circulating operation and removes the solution from the system.

Fig. 3 shows a modified form of system which is similar to the preferred form of the invention. In Fig. 3 the primed numerals indicate parts which may be similar to those parts of the preferred form which are indicated by the same numerals unprimed. In Fig. 3 the conduit 20' is provided with a T connection 48 which is capped during the normal milking operation. Similarly, the outlet of valve 24' is normally capped during the milking operation. Permanent conduit 29 of the preferred form is eliminated from the form of Fig. 3, and the connection 49 of valve 15' is normally capped during the milking operation.

The flow of milk through the modified form of the invention during the milking operation is substantially the same as that through the preferred form. To arrange the system for cleaning, however, an extent of hose 29' is connected to connection 49 of valve 15' and to T connection 27' of conduit 26' as shown. A hose 25' is also connected to the valve 24' and to T connection 48, as shown. The cleaning operation is then carried out in substantially the same manner described with respect to the preferred form of the invention.

It is apparent that in the improved milking system a single pump is utilized both for pumping milk from the receiver jar into the storage receptacle, and for circulating detergent solution through the lines of the system. This arrangement is made possible by the novel arrangement of conduits and by incorporation at a particular point in the system of the novel venturi type check valve 30 which permits the use of a relatively high capacity pump of the centrifugal type well suited for the flushing operation for pumping milk at relatively low velocities during milking, the system being so arranged that during cleaning operation the pump circulates detergent solution through the system at full capacity. There is no danger of loss of vacuum through the centrifugal pump, and the system is readily adapted to various rates of milk flow brought about by variations in the number of cows to be milked. The latter is quickly taken care of by selecting a venturi insert of the proper size for the particular milk flow into the receiver 12.

Various changes and modifications may be made without departing from the spirit of the invention, and all of such changes are contemplated as may come within the scope of the claims.

What I claim is:

1. A dairy barn milking system, comprising: a source of cleaning solution, a main supply line for receiving milk at a milking station; a receiver normally under a vacuum in communication with said main line; a high velocity pump having an inlet and an outlet capable of developing a high fluid velocity in said line and having its inlet communicating with said receiver for pumping milk therefrom; a receptacle; a conduit connected to the outlet of said pump and positioned to direct the discharge of said pump into the receptacle; a flow restricting member in said conduit limiting the rate at which milk is pumped from the receiver by said high velocity pump; and connecting means for alternatively connecting the inlet of said pump with said source of cleaning solution and the outlet of said pump with said main supply line at a location ahead of said flow restricting member, whereby the same high velocity pump can be used for selectively pumping milk from the receiver at a predetermined limited rate or for pumping cleaning solution through said line at an unrestricted faster rate.

2. A dairy barn milking system, comprising: a source of cleaning solution, a main supply line for receiving milk at a milking station; a receiver normally under a vacuum in communication with said main line; a high velocity centrifugal pump having an inlet and an outlet capable of developing a high fluid velocity in said line and having its inlet communicating with said receiver for pumping milk therefrom; a receptacle; a conduit connected to the outlet of said pump and positioned to direct the discharge of said pump into the receptacle; a flow restricting member in said conduit limiting the rate at which milk is pumped from the receiver by said high velocity pump; and connecting means for alternatively connecting the inlet of said pump with said source of cleaning solution and the outlet of said pump with said main supply line at a location ahead of said flow restricting member, whereby the same high velocity pump can be used for selectively pumping milk from the receiver at a predetermined limited rate or for pumping cleaning solution through said line at an unrestricted faster rate.

3. A dairy barn milking system, comprising: a source of cleaning solution, a main supply line for receiving milk at a milking station; a receiver normally under a vacuum in communication with said main line; a high velocity pump having an inlet and an outlet capable of developing a high fluid velocity in said line and having its inlet communicating with said receiver for pumping milk therefrom; a receptacle; a conduit connected to the outlet of said pump and positioned to direct the discharge of said pump into the receptacle; a flow restricting member in said conduit limiting the rate at which milk is pumped from the receiver by said high velocity pump; and connecting means for alternatively connecting the inlet of said pump with said source of cleaning solution and the outlet of said pump with said main supply line in a location to by-pass said flow restricting member, whereby the same high velocity pump can be used for selectively pumping milk from the the receiver at a predetermined limited rate or for pumping cleaning solution through said line at an unrestricted faster rate.

4. A dairy milking system, comprising: a source of cleaning solution, a loop-shaped main supply line for receiving milk at a milking station, said line having a pair of ends; a receiver normally under a vacuum with which both of said ends of the main line normally communicate; a high velocity pump having an inlet and an outlet capable of developing a high fluid velocity in said line and having its inlet communicating with said receiver for pumping milk therefrom; a receptacle; a conduit connected to the outlet of said pump and positioned to direct the discharge of said pump into said receptacle; a flow restricting member in said conduit limiting the rate at which milk is pumped from the receiver by said high velocity pump; and connecting means for alternatively connecting the inlet of said pump with said source of cleaning solution and the outlet of said pump with one of said main supply line ends at a location ahead of said flow restricting member whereby the same pump can be used for selectively pumping milk from the receiver at a predetermined limited rate or for pumping cleaning solution through said main line and said receiver at an unrestricted faster rate.

5. A dairy barn milking system, comprising: a source of cleaning solution, a main supply line for receiving milk at a milking station; a receiver normally under a vacuum in communication with said main line; a high velocity pump having an inlet and an outlet capable of developing a high fluid velocity in said line and having its inlet communicating with said receiver for pumping milk therefrom; a receptacle; a conduit connected to the outlet of said pump and positioned to direct the discharge of said pump into the receptacle; a venturi type check valve in said conduit limiting the rate at which milk is pumped from the receiver by said pump and preventing the entrance of air into the receiver in the event that said receiver is pumped dry by said pump; and connecting means for alternatively connecting the inlet of said pump with said source of cleaning solution and the outlet of said pump with said main supply line at a location ahead of said check valve, whereby the same high velocity pump can be used for selectively pumping milk from the receiver at a predetermined limited rate or for pumping cleaning solution through said line at an unrestricted faster rate.

References Cited in the file of this patent

UNITED STATES PATENTS

| 987,719 | Hayden | Mar. 28, 1911 |
| 1,393,387 | McCornack | Oct. 11, 1921 |
| 1,672,394 | Sargent | June 5, 1928 |
| 2,018,769 | Tryon | Oct. 29, 1935 |
| 2,558,628 | Redin | June 26, 1951 |
| 2,624,355 | Buchinger | Jan. 6, 1953 |
| 2,647,639 | Grein | Aug. 4, 1953 |
| 2,680,445 | Hemminger | June 8, 1954 |

OTHER REFERENCES

De Laval Model F, Combine Milking System, The De Laval Separator Co., 165 Broadway, New York 6, of 1950, pages 14 and 16.